Sept. 2, 1924.　　　　C. W. WATSON　　　　1,507,536
DUST CAP REMOVER
Filed May 23, 1922　　　2 Sheets-Sheet 1
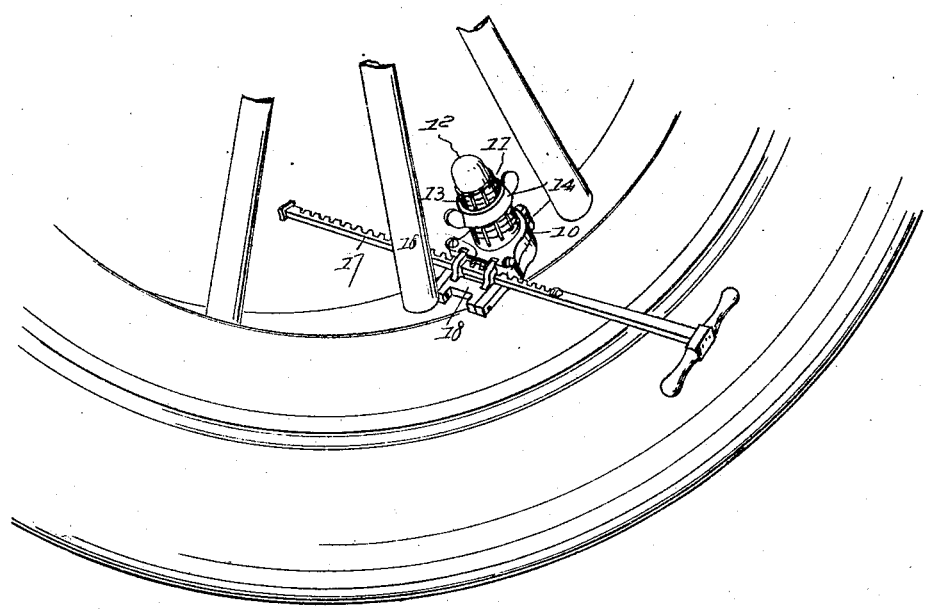
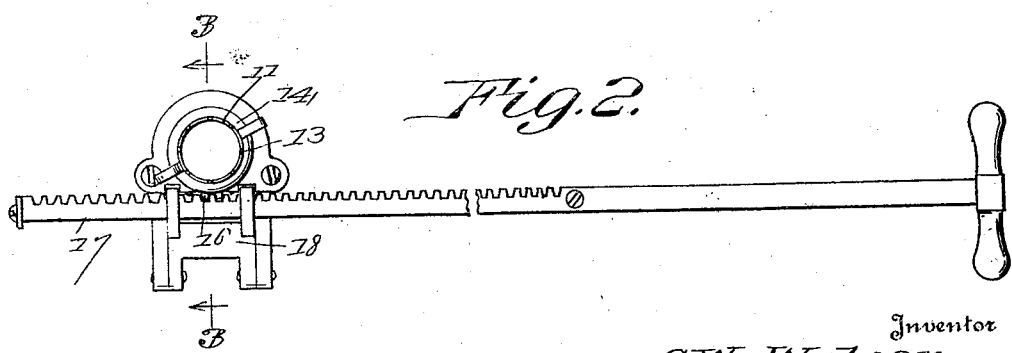
Inventor
C. W. Watson,
By
Attorney Sept. 2, 1924.          C. W. WATSON          1,507,536
                        DUST CAP REMOVER
                   Filed May 23, 1922        2 Sheets-Sheet 2
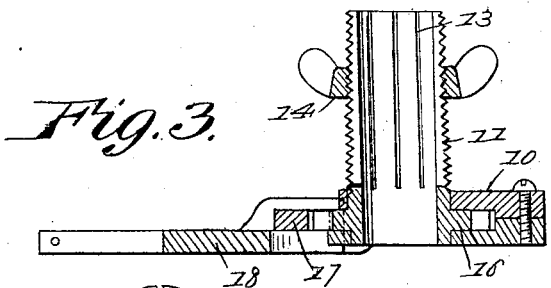
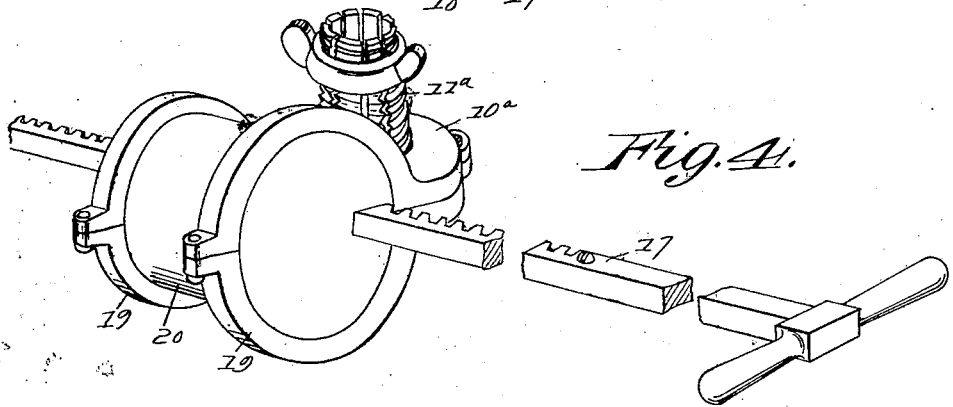
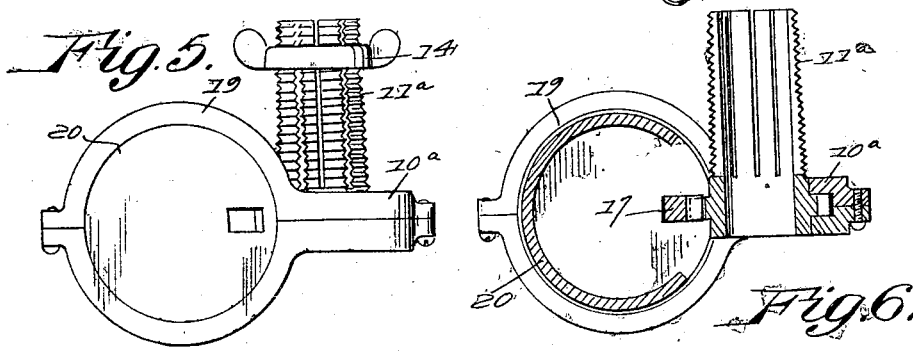
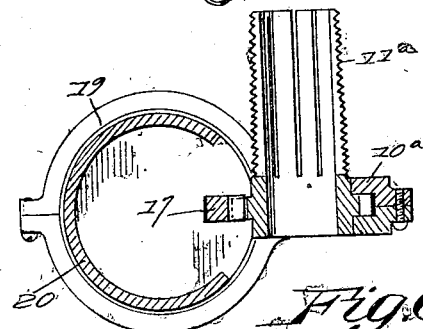
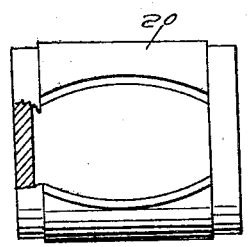
Inventor
C. W. Watson,
By
Attorney Patented Sept. 2, 1924.

1,507,536

UNITED STATES PATENT OFFICE.

CLARENCE W. WATSON, OF ALLIANCE, OHIO.

DUST-CAP REMOVER.

Application filed May 23, 1922. Serial No. 563,102.

*To all whom it may concern:*

Be it known that I, CLARENCE W. WATSON, a natural-born citizen of the United States of America, residing at Alliance, in the county of Stark and State of Ohio, have invented new and useful Improvements in Dust-Cap Removers, of which the following is a specification.

The object of the invention is to provide a simple and efficient means for removing, temporarily holding and replacing dust caps such as those used in connection with tire valve tubes and the like as a means primarily of permitting the caps to be firmly set or secured in place to avoid loss due to vibration of the wheels and yet readily removable to permit of inflation of the tires, and with a further view to the holding of the cap when removed to prevent loss or misplacement until restored to its proper position on the tube; and with this object in view the invention consists in a construction and combination of parts of which a preferred embodiment is shown in the accompanying drawings, wherein:—

Figure 1 is a view of a dust-cap operating device embodying the invention applied in the operative position to a dust-cap in the act of removing or applying the same;

Fig. 2 is a plan view of the same;

Fig. 3 is a sectional view on the plane indicated by the line 3—3 of Fig. 2 and indicating in dotted lines the displaced position of the rack;

Fig. 4 is a view of a modified form of the device showing a rotary instead of a hinge construction of carrier for the rack;

Fig. 5 is a side view; and

Fig. 6 is a sectional view of the construction shown in Fig. 4.

Fig. 7 is an elevational view, partly in section, of the rotary carrier member.

The device consists essentially of a yoke 10 in which is swiveled a sleeve 11 forming a socket or clamp for a dust cap 12 and longitudinally split as shown at 13 for diametrical contraction by means of a thumb nut 14 which is threaded exteriorly thereon to securely engage and hold the dust cap. The sleeve is provided with a gear 16 for engagement by a rack bar 17 mounted in a carrier 18 which is pivotally mounted between the arms of the yoke and is adapted to be swung out of the plane of the yoke arms to disengage the rack from the gear.

Having engaged the sleeve with the dust-cap it is obvious that a longitudinal movement in one direction or the other of the rack in the position in which it is engaged with the gear will turn the cap so as to effect either the engagement or the disengagement thereof, and upon disengagement of the cap it is obvious that it may remain in position in the tool until replaced, so that loss thereof in the interval between removal and replacement may be avoided.

The purpose of providing means for disengaging the rack from the sleeve is to permit its return to initial position to further continue the operation of unscrewing the cap. For example, the sleeve is engaged with the cap and the rack in its full withdrawn position is engaged with the sleeve and moved longitudinally, thus imparting rotary movement to the sleeve and with it the cap. If the movement of the rack the full length of the latter is not sufficient to disengage the cap, the rack is disengaged from the sleeve and moved longitudinally in the other direction than formerly and then re-engaged with the sleeve and the initial movement repeated, thus continuing the rotation of the sleeve in the same direction and thereby effecting disengagement of the cap. In the replacing operation, the same cycle of operations is repeated with the exception that in the forward stroke the rack and sleeve are disengaged and in the reverse stroke indicated, so as to effect reverse movement of the sleeve as in attaching the cap.

In the modified construction shown in Figures 4 to 6 inclusive, the yoke 10ª in which the sleeve 11ª is swiveled, said sleeve being constructed and arranged substantially as described in connection with the forms shown in Figures 1 to 3 inclusive, is provided with bearings 19 for the reception of a rotary carrier 20 having guides for the rack bar which engages the gear teeth of the sleeve and which operates as hereinbefore described.

The carrier is revoluble in its bearings to cause engagement and disengagement of the rack with relation to the gear.

Having described the invention, what is claimed as new and useful is:—

1. A dust cap removing tool having a yoke, a diametrically contractable sleeve having gear teeth swiveled in the yoke for engaging a dust cap, and means for effecting rotary movement of the sleeve consisting of a slidable rack bar engaging the teeth on the sleeve.

2. A dust-cap removing tool having a yoke, a sleeve swiveled in the yoke, and means for effecting rotary movement of the sleeve, said sleeve being diametrically contractable to engage the dust cap.

3. A dust-cap removing tool having a yoke, a sleeve swiveled in the yoke for engaging a dust cap, and means for effecting rotary movement of the sleeve, said sleeve being longitudinally split and a contracting nut fitted on the sleeve.

4. A dust-cap removing tool having a yoke, a sleeve swiveled in the yoke for frictionally engaging a dust cap, and a rack bar for effecting rotary movement of the sleeve, a carrier being movably mounted upon the yoke and slidably supporting said rackbar.

5. A dust-cap removing tool having a yoke, a sleeve swiveled in the yoke for frictionally engaging a dust-cap, a rack-bar for effecting rotary movement of the sleeve, and a carrier provided with guides for the longitudinal movement of said rack-bar, said carrier being supported by said yoke and movable to disengage the rack-bar from the sleeve.

In testimony whereof he affixes his signature.

CLARENCE W. WATSON.